US007768508B2

(12) United States Patent
Okuley

(10) Patent No.: US 7,768,508 B2
(45) Date of Patent: Aug. 3, 2010

(54) CONVERTIBLE DISPLAY

(75) Inventor: Jim Okuley, Portland, OR (US)

(73) Assignee: Intel Corporation, San Jose, CA (US)

( * ) Notice: Subject to any disclaimer, the term of this patent is extended or adjusted under 35 U.S.C. 154(b) by 1116 days.

(21) Appl. No.: 11/367,991

(22) Filed: Mar. 3, 2006

(65) Prior Publication Data

US 2007/0206346 A1 Sep. 6, 2007

(51) Int. Cl.
*G09G 5/00* (2006.01)
(52) U.S. Cl. .................. 345/204; 345/168; 345/169
(58) Field of Classification Search ............. 345/204, 345/168–169
See application file for complete search history.

(56) References Cited

U.S. PATENT DOCUMENTS

| 5,901,222 | A * | 5/1999 | Macor ............... 379/433.04 |
| 6,052,116 | A * | 4/2000 | Takagi ............... 345/169 |
| 6,128,192 | A * | 10/2000 | Howell et al. .......... 361/724 |
| 6,404,622 | B1 * | 6/2002 | Chen .................. 361/679.28 |
| 2004/0066913 | A1 * | 4/2004 | Kennedy et al. ........ 379/22 |
| 2007/0083691 | A1 * | 4/2007 | Keely et al. .......... 710/303 |
| 2008/0067842 | A1 * | 3/2008 | Chang ................ 297/217.3 |

OTHER PUBLICATIONS

"Akihabara News—4 Concept PC's from NEC at the WPC Expo 2005", http://www.akihabaranews.com/en/news-10514-4+concept+PC%27s+from+NEC+at+the+WPC+Expo+2005.html, (Posted Oct. 26, 2004), 11 pgs.
"ATSC Standard: Digital Television Standard, Revision B, with Amendment 1", Doc. A/53B, Advanced Television Systems Committee, Washington, D.C.,(Aug. 7, 2001), 80 pgs.
"Digital Audio Broadcasting (DAB); Data Broadcasting—MPEG-2 TS Streaming", ETSI TS 102 427 V1.1.1 (Jul. 2005)—*Technical Specification*, European Broadcasting Union, (2005) , 9 pgs.
"Digital Audio Broadcasting (DAB); DMB Video Service; User Application Specification", ETSI TS 102 428 V1.1.1 (Jun. 2005)—*Technical Specification*, European Broadcasting Union, (2005), 30 pgs.
"Digital Video Broadcasting (DVB); Framing Structure, Channel Coding and Modulation for Digital Terrestrial Television", ETSI EN 300 744 V1.5.1 (Nov. 2004), European Broadcasting Union, (2004), 64 pgs.
"Digital Video Broadcasting (DVB); Transmission System for Handheld Terminals (DVB-H)", ETSI EN 302 304 V1.1.1 (Nov. 2004), (2004), 14 pgs.
"Specification of Interfaces for 625-Line Digital PAL Signals", *Tech 3280-E*, European Broadcasting Union, Apr. 1995), 18 pgs.

* cited by examiner

*Primary Examiner*—Richard Hjerpe
*Assistant Examiner*—Leonid Shapiro
(74) *Attorney, Agent, or Firm*—Schwegman, Lundberg & Woessner, P.A.

(57) ABSTRACT

Apparatus and systems, as well as methods and articles, may operate to permit the exposure of a display electrically coupled to a television tuner and a computer when the display, mechanically coupled to a stand by a sliding hinge, is moved from a closed position to an open position. The computer or the display may be operated using a remote control included in the stand. When in the closed position, the stand may provide protection for the display.

15 Claims, 10 Drawing Sheets

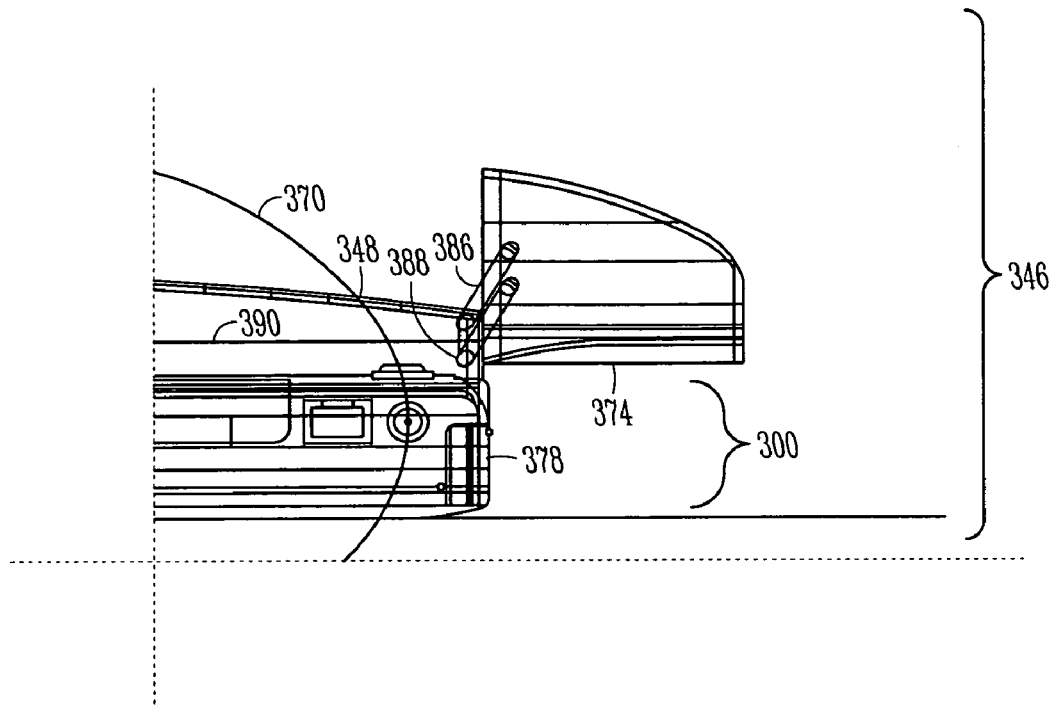
FIG. 3C
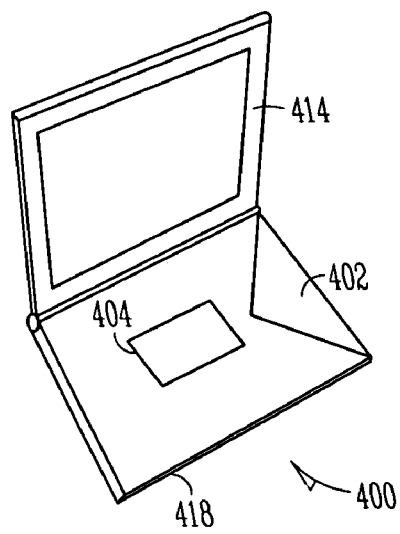
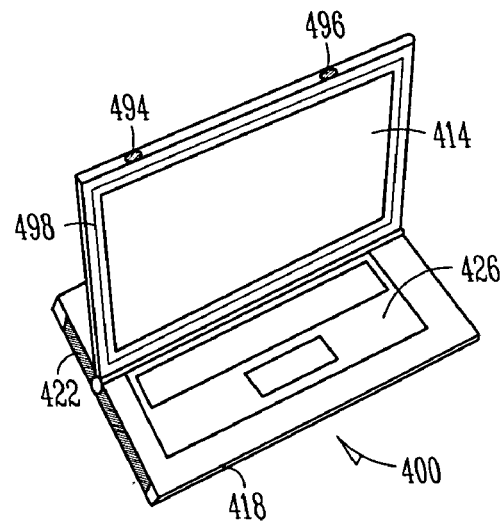
FIG. 4A　　　　　　FIG. 4B

CONVERTIBLE DISPLAY

TECHNICAL FIELD

The various embodiments described herein relate to information processing generally, including apparatus, systems, and methods used to display information.

BACKGROUND INFORMATION

Notebook computers have become increasingly popular, valued for their portable business information processing, as well as their standalone entertainment capabilities. Thus, a single unit can often be used as a digital video media player and a computer, for example. However, clamshell designs are awkward to open and close when operating in confined spaces, and tablet models offer no protection for the display screen.

BRIEF DESCRIPTION OF THE DRAWINGS

FIGS. 3A-3C illustrate one possible arrangement of speakers in an apparatus according to various embodiments of the invention.

FIGS. 4A-4D illustrate one possible arrangement of conductors included in an apparatus according to various embodiments of the invention.

DETAILED DESCRIPTION

Figure 1:
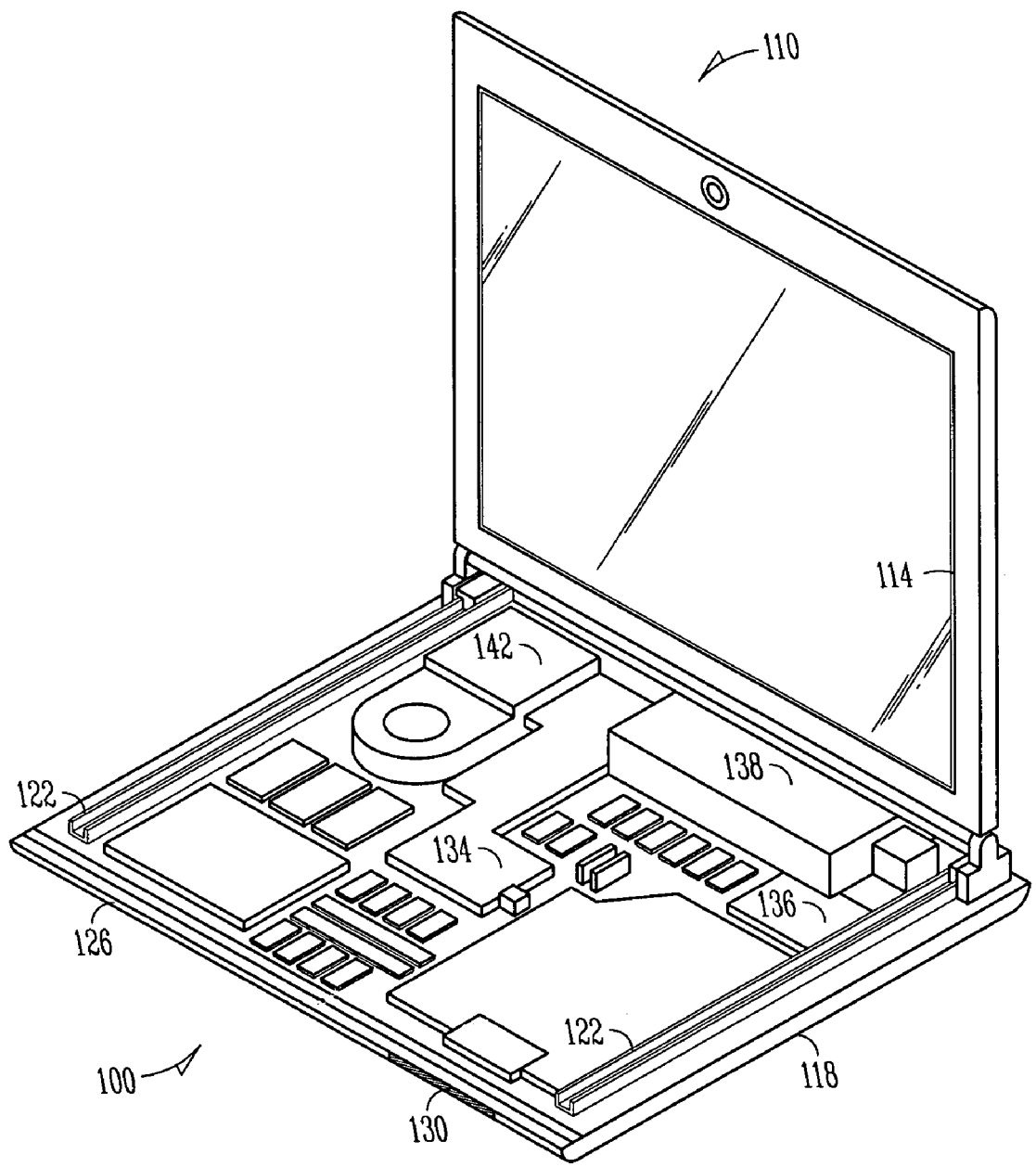
FIG. 1 illustrates an apparatus and system according to various embodiments of the invention.

FIG. 1 illustrates an apparatus 100 and system 110 according to various embodiments of the invention. To address the challenges described above, a display apparatus 100 may include a display 114 and a stand 118 coupled to a sliding hinge 122, so that the display apparatus 100 can be more easily opened and closed in a confined space. The stand 118 may include a keyboard 126 and a remote control 130 to control display operations. Either the keyboard 126 or the remote control 130, or both may comprise wireless communication devices. The remote control 130 may be stored in the keyboard 126. The stand 118 provides a protective cover for the display 114 when the display apparatus 100 is in a closed position (e.g., see FIG. 2E), and a variable viewing angle for the display 114 when in an open position. The display apparatus 100 may include a processor 134 coupled to the display 114. In some embodiments, the display apparatus 100 comprises a thin client 136 that communicates with a remote computer (not shown).

Other embodiments may be realized. For example, a display system 110 may include a display apparatus 100, as described above. The display system 110 may also include one or more television tuners 138 to couple to the display 114. The television tuners 138 may include NTSC (National Television Systems Committee), ATSC (Advanced Television Systems Committee), PAL (Phase Alternating Line), DVB-T (Digital Video Broadcasting—Terrestrial), DVB-H (Digital Video Broadcasting: Handhelds), and DMB (Digital Multimedia Broadcasting) tuners.

For more information regarding NTSC, ATSC, PAL, DVB-T, DVB-H, and DMB standards, please refer to the following documents: Society of Motion Picture and Television Engineers, "Television—Composite Analog Video Signal—NTSC for Studio Applications," SMPTE-170M, 1994; ATSC Standard: Digital Television Standard, Revision B, Doc. A/53B, Aug. 7, 2001; European Broadcasting Union Technical Document: Tech 3280 1995, "Specification of Interfaces for 625-line Digital PAL Signals"; ETSI EN 300 744 V1.5.1 (2004-11), "Digital Video Broadcasting (DVB); Framing Structure, Channel Coding and Modulation for Digital Terrestrial Television"; ETSI EN 302 304 V1.1.1 (2004-11), "Transmission System for Handheld Terminals (DVB-H)"; European Telecommunications Standards Institute (ETSI) TS 102 427 "Digital Audio Broadcasting (DAB); Data Broadcasting—MPEG-2 TS streaming," Ver. 1.1.1, 2005; and TS 102 428 "Digital Audio Broadcasting (DAB); DMB video service; User Application Specification," Ver. 1.1.1, 2005; respectively, and later versions.

In some embodiments, high thermal energy components, such as display drivers, may be moved behind the display 114, away from the user. This may provide more comfortable use when the display apparatus 100 or display system 110 is held on the user's lap, and longer system life when the display apparatus 100 is used on a bed, where conventional notebooks might overheat when the vents in the base are covered by bedding.

The remote control 130 may be used to control the operations of the television tuners 138, as well as to direct the operations of the display 114 when receiving and processing media content provided by a network. In some embodiments, the display system 110 may include a projector 142 to couple to the display 114, so that multimedia presentations, visible on the display 114, may be projected onto a larger surface for viewing by an audience, if desired.

FIGS. 2A-2F illustrate apparatus 200 and systems 210 in a variety of configurations according to various embodiments of the invention. The display apparatus 200 may be similar to or identical to the display apparatus 100, described above. Similarly, the display system 210 may be similar to or identical to the display system 110, described above.

In some embodiments, the display apparatus 200 may comprise a mobile computing device, such as a personal digital assistant (PDA) or digital music player. Display applications include but are not limited to: email viewing, instant messaging, time-of-day and calendar reminders, system status information (e.g., battery charge condition and wired/wireless network connectivity), multimedia playback (e.g., photos, movies, music, network radio, rich site summary (RSS) feeds, and live television), transient information presentation (e.g., current news, sports, weather, stock quotes, horoscopes, lottery results, cinema and theater show times, auction status, package shipment status, and airplane flight status), document presentations, and slide shows.

Figure 2A:
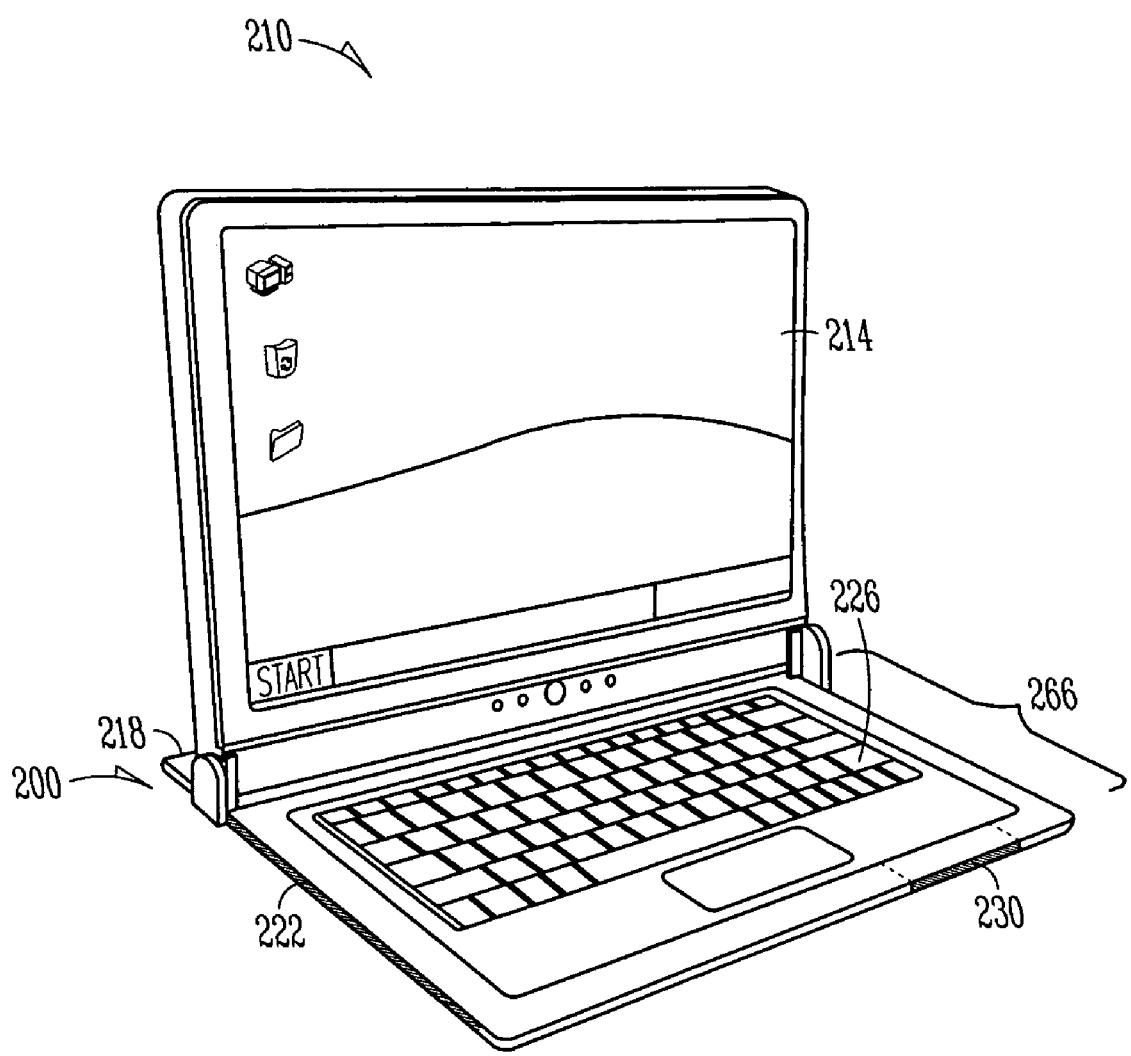
FIGS. 2A-2F illustrate apparatus and systems in a variety of configurations according to various embodiments of the invention.
Figure 2B:
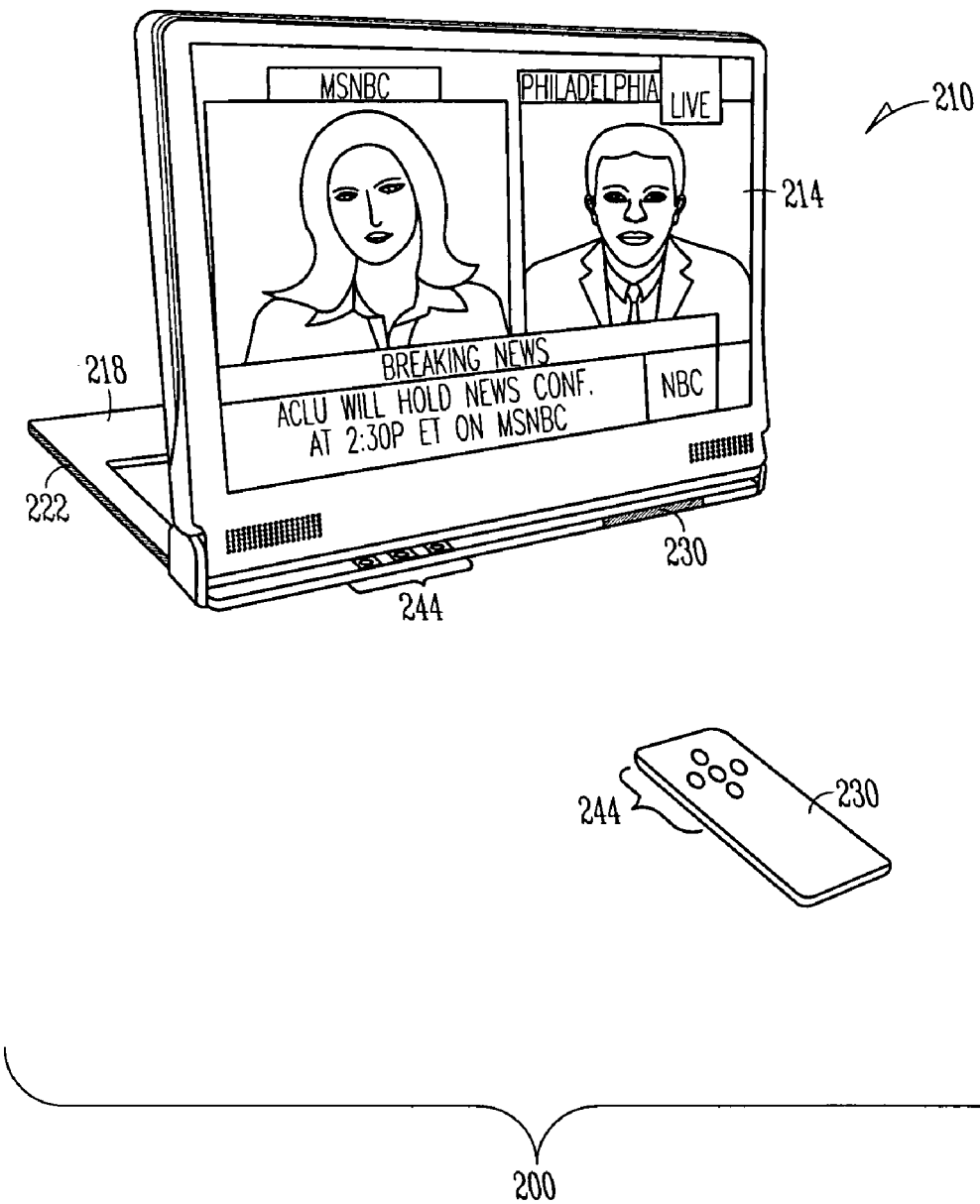
Figure 2C:
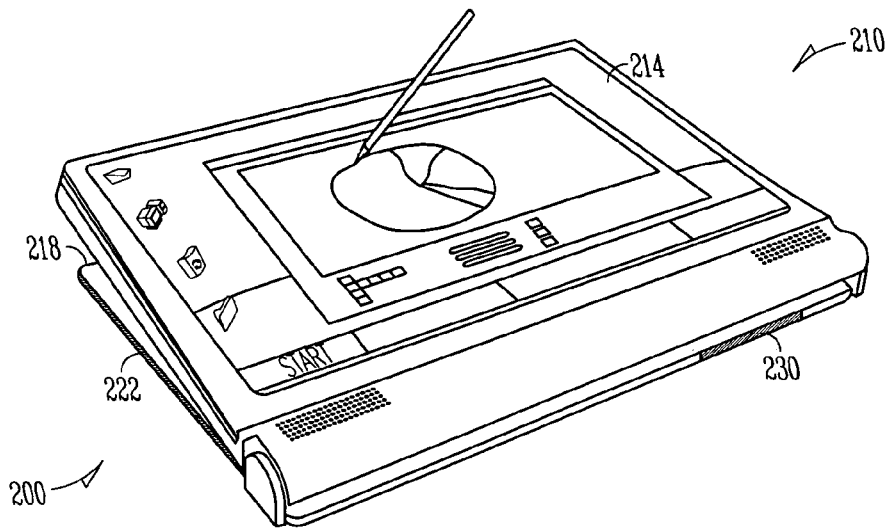
Figure 2D:
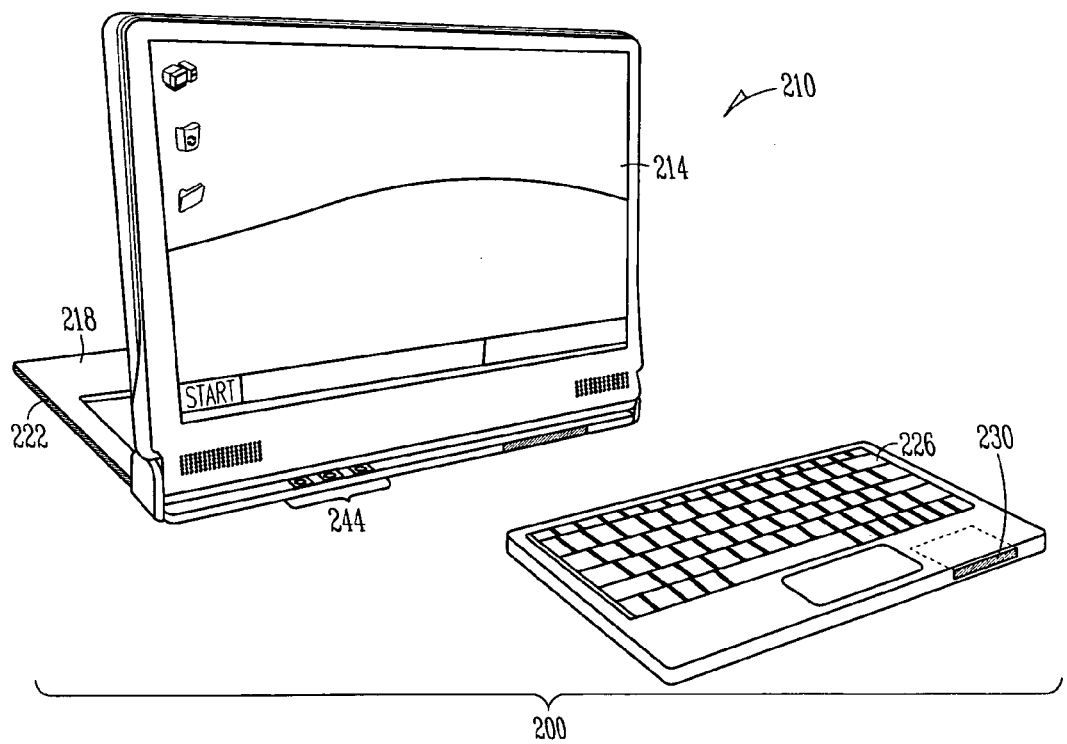

The unique interaction of the display 214, the stand 218, and the sliding hinge 222 allows the user to convert the display apparatus 200 and display system 210 from a notebook PC (personal computer) form factor (see FIGS. 2A and 2D) to a television form factor (see FIG. 2B), as well as into a tablet PC form factor (see FIG. 2C). The adjustable stand 218 may be used to house a keyboard 226 and/or remote control 230. The keyboard 226 may include rechargeable batteries for remote use, and obtain power from the stand 218 when it is stored therein. The remote control 230 and/or the stand 218 may include a set of video playback controls 244 (e.g., stop, play, fast-forward, rewind, and pause).

In some embodiments, the keyboard 226 may be stored in the stand 218 that comprises an open-sided frame 266 (see FIG. 2A) so that the keyboard 226 can be accessed by a user without removing it from the stand 222. Thus, the stand 222 and/or keyboard 226 can provide protection for the display 214 when the display apparatus 200 is placed in a closed position for transport (see FIG. 2E). When in use, the keyboard 226 can be placed closer to the user and the display 214 moved to any desired independent position (see FIG. 2D).

Figure 2E:
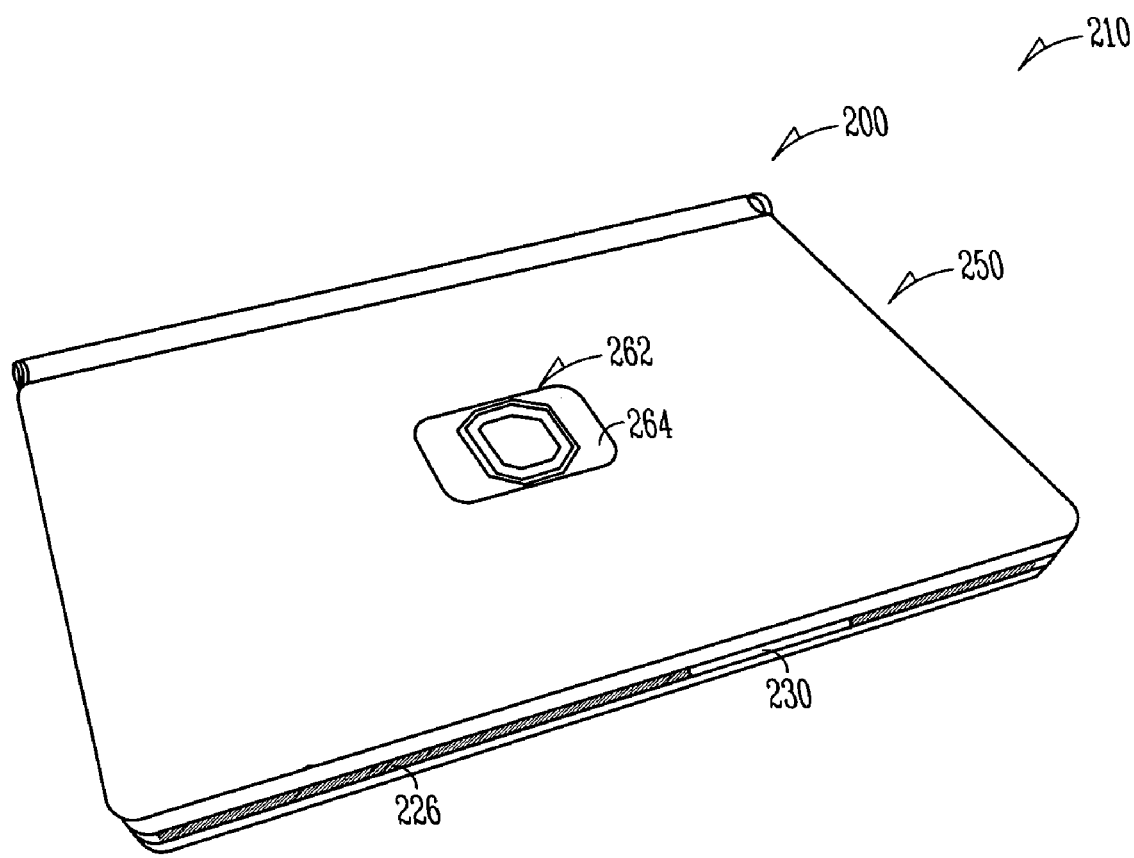

In some embodiments, the display apparatus 200 may include an illuminated window 262, as shown in FIG. 2E. The window 262 permits the user to personalize the display apparatus 200 by placing photos or graphics behind a protective, substantially transparent cover 264.

Figure 2F:
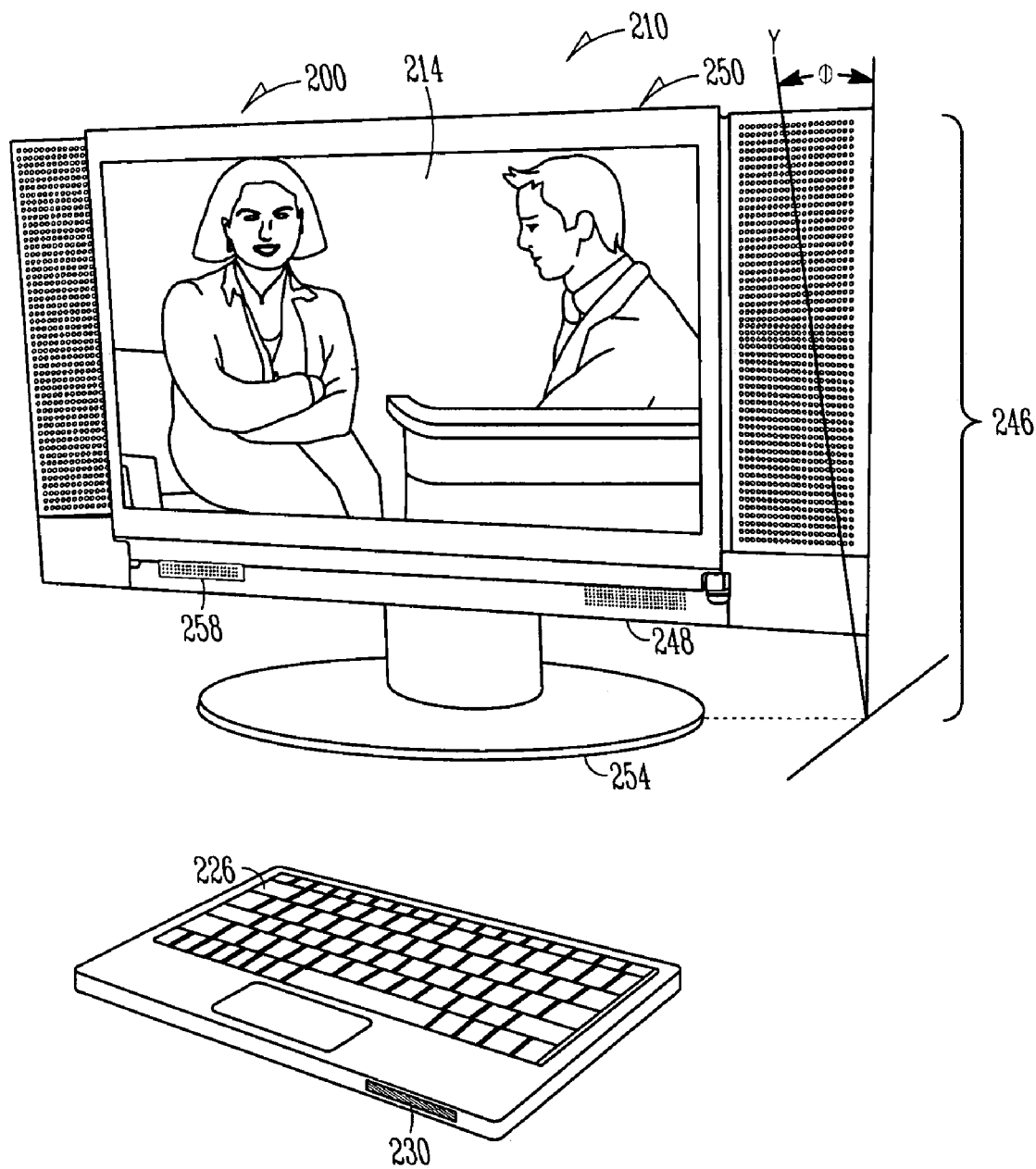

Many embodiments may be realized. For example, as shown in FIG. 2F, a docking apparatus 246 may include a computer dock 248 to receive a computer 250 having an integrated display 214. The dock 248 can be used to hold the display 214 at an angle φ within about 60 degrees of a line Y substantially perpendicular to a bottom surface 254 of the computer dock 248. In this manner, the dock 248 can provide a better, more natural television viewing experience at an ergonomic height, as well as providing for desktop computer usage with a separate keyboard 226.

The docking apparatus 246 may have a digital communications port 258 included in the dock 248. The digital communications port 258 may comprise one or more serial ports (e.g., USB or FireWire), parallel ports (e.g., general purpose interface bus (GPIB) or printer port), wired network interfaces, optical interfaces, and/or wireless network interfaces, including interfaces operating according to an Institute of Electrical and Electronics Engineers (IEEE) 802.11x standard.

For more information regarding the FireWire interface, please refer to the IEEE 1394b-2002 Standard, "IEEE Standard for a High Performance Serial Bus—Amendment 2," published in 2002, and recent revisions. For more information regarding IEEE 802.11x (e.g., IEEE 802.11g) standards, please refer to "IEEE Standards for Information Technology—Telecommunications and Information Exchange between Systems—Local and Metropolitan Area Network—Specific Requirements—Part 11: Wireless LAN Medium Access Control (MAC) and Physical Layer (PHY), ISO/IEC 8802-11: 1999," and related amendments/revisions.

The display apparatus 200 and display system 210 can be placed into the dock 248 with the display 214 in an open position (as shown in FIG. 2F), or in a closed position (see FIG. 2E). When the apparatus 200 or system 210 is placed into the dock 248 with the display in a closed position, a user can then transport the dock 248 and the display apparatus 200 or display system 210 as a single unit, while the display 214 is protected.

Figure 3A:
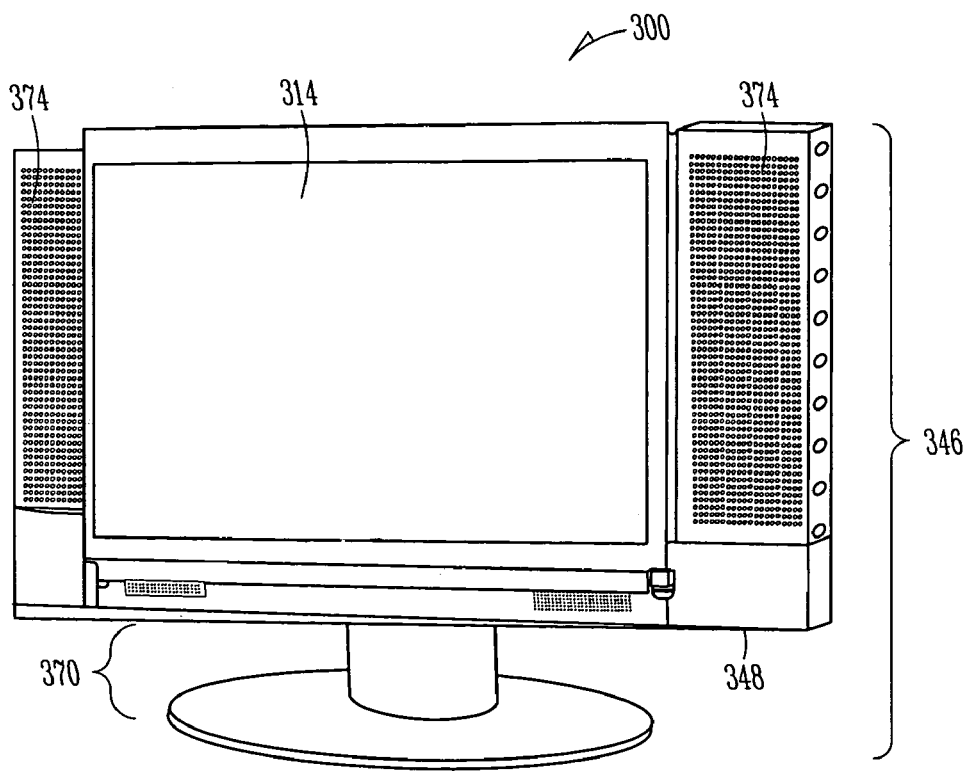
Figure 3B:
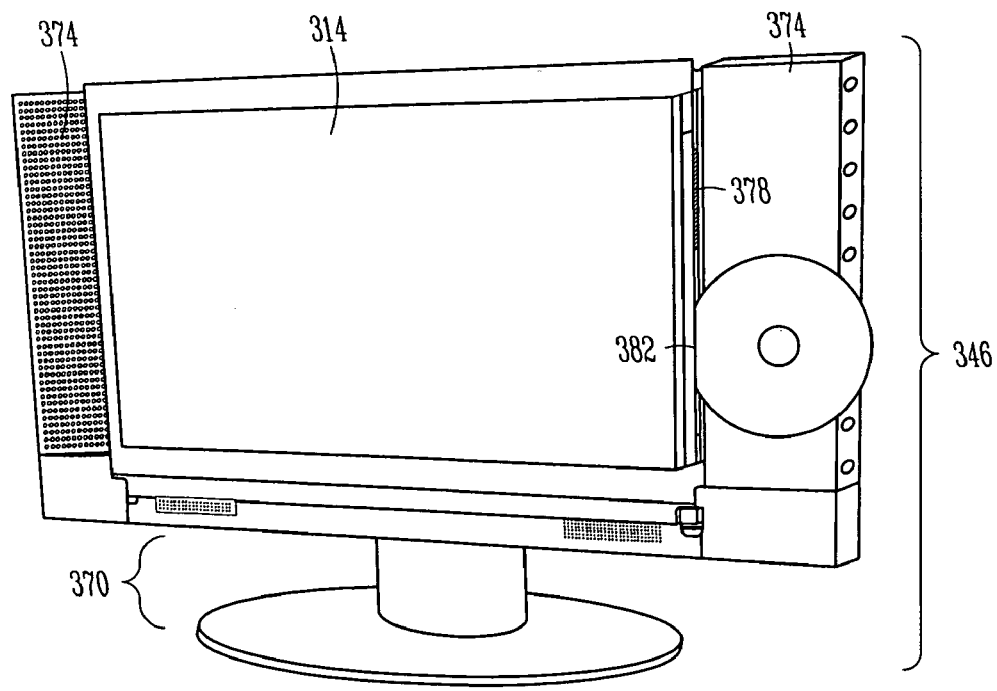
Figure 4C:
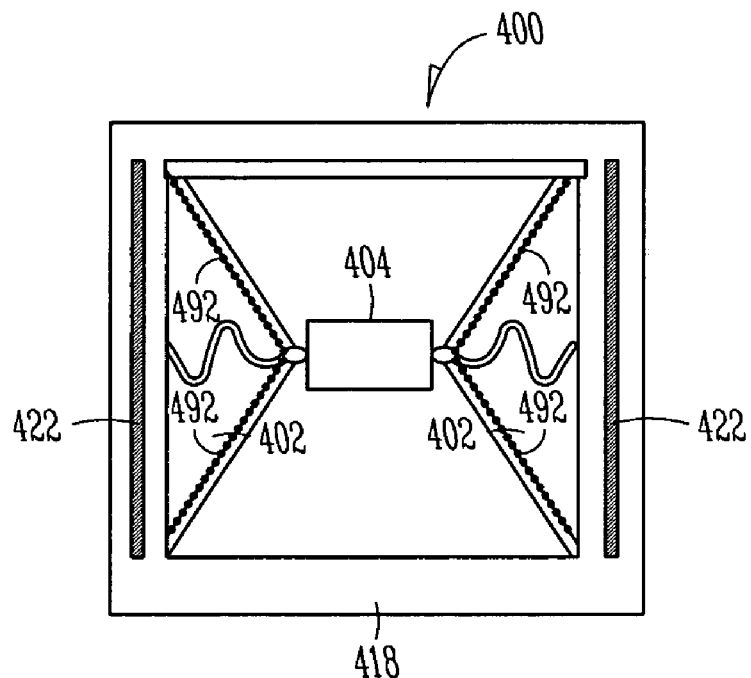
Figure 4D:
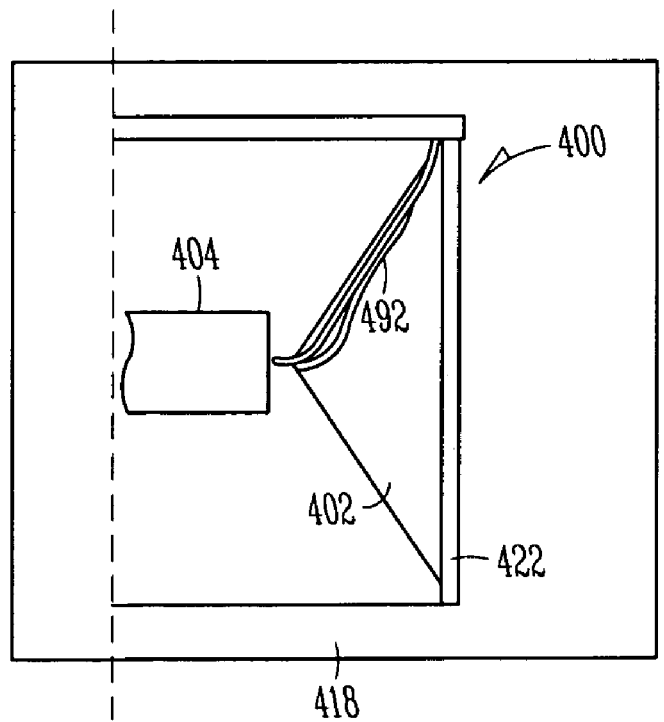

FIGS. 3A-3C illustrate one possible arrangement of speakers in an apparatus 346 according to various embodiments of the invention. The docking apparatus 346 may be similar to or identical to the docking apparatus 246, described above. Thus, sound may be provided to the user by a variety of arrangements. For example, the docking apparatus 346 may include a dock 348 comprising an adjustable stand 370 with speakers 374 that move to allow for access to input/output (I/O) ports 378 and removable media ports 382 of the docked display apparatus 300. The speakers 374 may slide or rotate to give users access to the I/O ports 378 and removable media ports 382.

In some embodiments, the docking apparatus 346 may include one or more speakers 374 coupled to the dock 348 using a hinge 386, a peg 388 in a slot 390, or both. When the speakers 374 are coupled to the dock 348, one or more of the speakers 378 may cover a removable media port 382 in a closed position, and uncover the removable media port 382 in an open position. In the closed position, the speakers 374 may be disposed substantially coplanar with the display 314 (see FIG. 3A).

FIGS. 4A-4D illustrate one possible arrangement of conductors included in an apparatus 400 according to various embodiments of the invention. The apparatus 400 may be similar to or identical to the apparatus 100 described above. In some embodiments, a unique wiring path is used to permit a relatively large bundle of conductors 492 to pass from the stand 418 through the sliding hinge 422 to the display 414. The conductors 492 may include signals coupled to the display 414 of the display apparatus 400, signals to a camera 494 and/or microphone 496, and even antennas 498. Since the conductors 492 have limited flexibility, an extensible arrangement and channelized wiring path 402 permits construction of a more compact apparatus 400. Thus, the apparatus 400 may include a plurality of conductors 492 extensibly attached to electronic logic 404 (e.g., a processor, similar to or identical to the processor 134 of FIG. 1) included in the stand 418 and feeding through the sliding hinge 422 to couple the electronic logic 404 to the display 414. The extensible, channelized conductors 492 permit the display 414 to move along the entire length of the sliding hinge 422 without constraint.

Any of the components previously described can be implemented in a number of ways, including simulation via software. Thus, the apparatus 100, 200, 300, 400; systems 110, 210; displays 114, 214; stands 118; sliding hinge 122; keyboard 126; remote control 130; processor 134; client 136; television tuners 138; projector 142; playback controls 144; computers 150, 250; window 162; docking apparatus 246, 346; docks 248, 348; surface 254; communications port 258; window 262; cover 264; stand 370; speakers 374; I/O ports 378; removable media ports 382; hinge 386; peg 388; slot 390; wiring path 402; electronic logic 404; conductors 492; camera 494; microphone 496; and antennas 498 may all be characterized as "modules" herein.

Such modules may include hardware circuitry, single and/or multi-processor circuits, memory circuits, software program modules and objects, and/or firmware, and combinations thereof, as desired by the architect of the apparatus 100, 200, 300, 400 and systems 110, 210, and as appropriate for particular implementations of various embodiments. For example, such modules may be included in a system operation simulation package, such as a software electrical signal simulation package, a power usage and distribution simulation package, a capacitance-inductance simulation package, a power/heat dissipation simulation package, a signal transmission-reception simulation package, and/or a combination of software and hardware used to operate, or simulate the operation of various potential embodiments.

It should also be understood that the apparatus and systems of various embodiments can be used in applications other than portable computers and multimedia players, and thus, various embodiments are not to be so limited. The illustrations of apparatus 100, 200, 300, 400 and systems 110, 210 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single and/or multi-processor modules, single and/or multiple embedded processors, data switches, and application-specific modules, including multi-layer, multi-chip modules. Such apparatus and systems may further be included as sub-components within a variety of electronic systems, such as televisions, cellular telephones, personal computers, workstations, radios, video players, audio players, medical devices, vehicles, and others.

Figure 5:
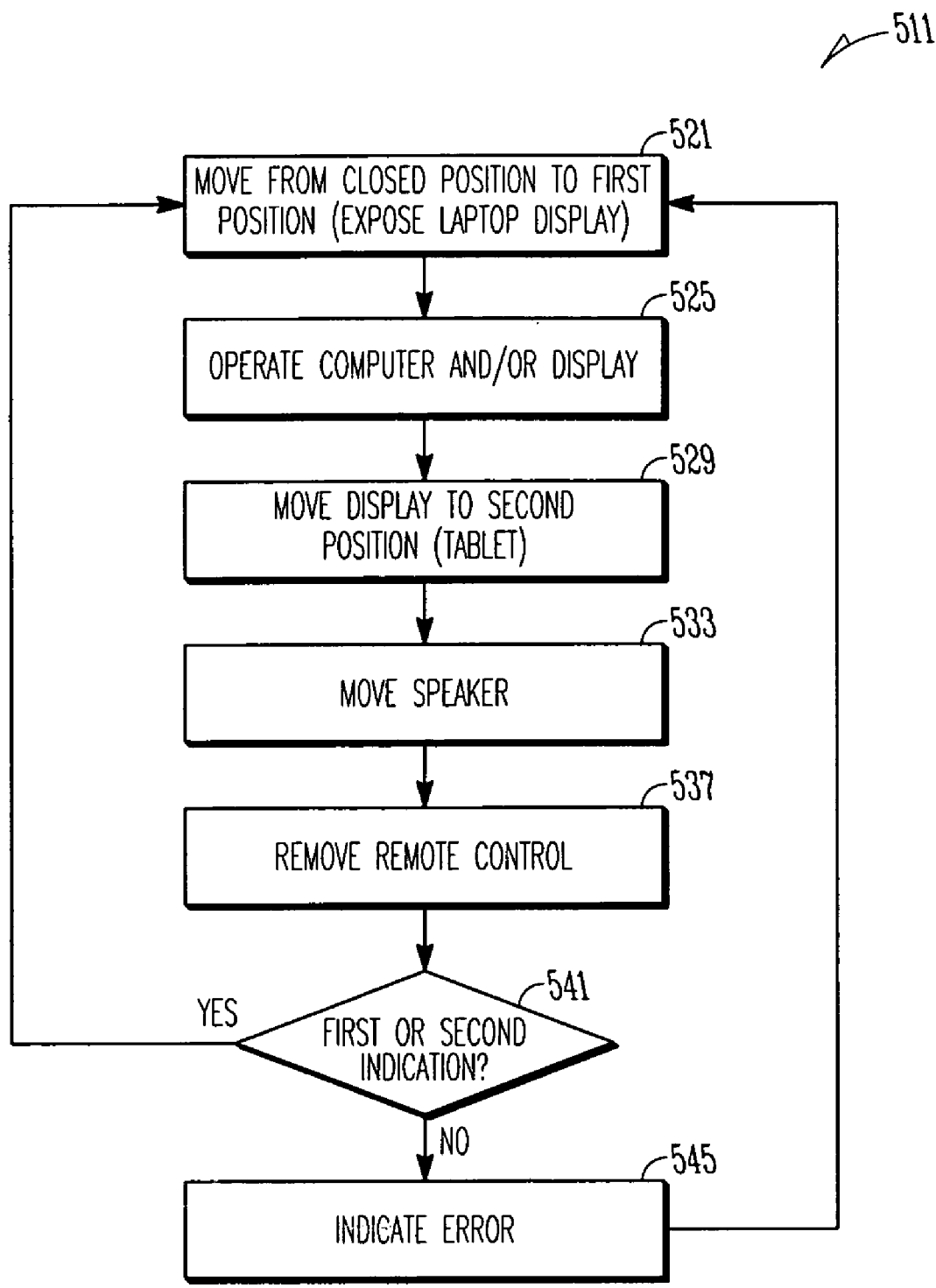
FIG. 5 is a flow diagram illustrating several methods according to various embodiments of the invention.

Some embodiments may include a number of methods. For example, FIG. 5 is a flow diagram illustrating several methods 511 according to various embodiments of the invention. A method 511 may include operating a display apparatus by exposing a display electrically coupled to a television tuner and a computer by moving the display, perhaps mechanically coupled to a stand by a sliding hinge, from a closed position to a first open position at block 521 (e.g., exposing the display of a laptop computer, or converting a display apparatus having a protected display into a desktop or laptop computer by exposing the display). The method 511 may include operating the computer, the display, or both, using a remote control included in the stand at block 525. The method 511 may also include moving the display to a second open position at block 529, and then operating the display apparatus as a tablet computer.

The display apparatus may be placed in a dock, as described above. Thus, the method 511 may include moving a speaker mechanically coupled to a dock attached to the display from a closed position to an open position to expose one or more I/O ports at block 533. Before or after the display apparatus is placed in the dock, the method 511 may include removing a remote control from a storage receptacle in a keyboard included in the stand at block 537.

The method 511 may include receiving indications as to the status of the display apparatus. For example, the method 511 may include receiving a first indication that the display apparatus is in the first open position, and receiving a second indication that the display apparatus is in the second open position. If one of the indications is received, as determined at block 541, then the method may continue on to block 521. Otherwise, if neither indication is received, as determined at block 541, then the method 511 may include asserting an error condition or alarm at block 545.

It should be noted that the methods described herein do not have to be executed in the order described, or in any particular order. Moreover, various activities described with respect to the methods identified herein can be executed in repetitive, simultaneous, serial, or parallel fashion. Information, including parameters, commands, operands, and other data, can be sent and received in the form of one or more carrier waves.

Upon viewing the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment, including HTML and XML.

Thus, other embodiments may be realized. For example, an article of manufacture according to various embodiments, such as a computer, a memory system, a magnetic or optical disk, some other storage device, and/or any type of electronic device or system may include a computer coupled to a computer-readable medium. The computer-readable medium may include a tangible medium (e.g., fixed and removable storage devices, and memory having electrical, optical, or electromagnetic conductors) or an intangible medium, such as a carrier wave. The computer-readable medium may include information (e.g., computer program instructions and/or data), which when executed by the computer, causes the computer to perform a method including such actions as exposing a display (electrically coupled to a television tuner and a computer) by moving the display mechanically coupled to a stand by a sliding hinge from a closed position to a first open position. Additional activities may include any of those forming a portion of the methods illustrated in FIG. 5 and described above.

Implementing the apparatus, systems, and methods disclosed herein may permit the use of a sliding hinge to transform a display system, perhaps comprising a computer, from a closed position into an open, tablet format, while remaining substantially within the basic footprint of the system. Thus, the sliding hinge arrangement may enable a more comfortable operation of the computing apparatus and/or entertainment device in a wide variety of situations.

Although the inventive concept may be described in the exemplary context of an 802.xx implementation (e.g., 802.3ab, 802.11a, 802.11g, 802.11 HT, 802.11k, 802.16, 802.20, etc.), the claims are not so limited. Embodiments of the present invention may well be implemented as part of any wired or wireless system. Examples may also include embodiments comprising multi-carrier wireless communication channels (e.g., orthogonal frequency-division multiplexing (OFDM), discrete multi-tone modulation (DMT), etc.) such as may be used within a wireless personal area network (WPAN), a wireless local area network (WLAN), a wireless metropolitan area network (WMAN), a wireless wide area network (WWAN), a cellular network, a third generation (3G) network, a fourth generation (4G) network, a universal mobile telephone system (UMTS), and like communication systems, without limitation.

The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, including:
   a display coupled to a sliding hinge;
   a stand coupled to the sliding hinge, the stand including a keyboard and a remote control to control display operations;
   a plurality of conductors extensibly attached to electronic logic included in the stand and feeding through the sliding hinge to couple the electronic logic to the display; and
   a computer dock attached to the display and at least one speaker coupled to the computer dock, wherein the at least one speaker covers a removable media port in a closed position, and uncovers the removable media port in an open position.

2. The apparatus of claim 1, further including:
   a processor coupled to the display.

3. The apparatus of claim 1, wherein the stand provides a protective cover for the display in a closed position, and a variable viewing angle for the display when in an open position.

4. The apparatus of claim 1, further including:
   a wireless transmitter included in the keyboard.

5. The apparatus of claim 1, wherein the stand further includes:
   a set of video playback controls.

6. The apparatus of claim 1, wherein the removable media port comprises at least one of a serial port, a parallel port, a wired network interface, or an optical interface.

7. The apparatus of claim 1, wherein the at least one speaker is coupled to the computer dock using at least one of a hinge or a peg in a slot.

8. The apparatus of claim 1, further including:
   a projector to couple to the display.

9. A system, including:
   a display coupled to a sliding hinge;
   a stand coupled to the sliding hinge, the stand including a keyboard and a remote control to control display operations;
   a plurality of conductors extensibly attached to electronic logic included in the stand and feeding through the sliding hinge to couple the electronic logic to the display;
   a television tuner to couple to the display; and
   a computer dock attached to the display and at least one speaker coupled to the computer dock, wherein the at least one speaker covers a removable media port in a closed position, and uncovers the removable media port in an open position.

10. The system of claim 9, wherein the at least one speaker in the closed position is disposed substantially coplanar with the display.

11. The system of claim 9, further including:
    a projector to couple to the display.

12. A method, including:
    exposing a display electrically coupled to a television tuner and a computer by moving the display mechanically coupled to a stand by a sliding hinge from a closed position to a first open position;
    operating at least one of the computer or the display using a remote control included in the stand; and
    moving a speaker mechanically coupled to a dock attached to the display from a closed position to an open position to expose at least one input/output port, wherein the speaker covers the at least one input/output port in the closed position.

13. The method of claim 12, further including:
    moving the display to a second open position; and
    operating the computer as a tablet computer.

14. The method of claim 12, further including:
    removing a remote control from a storage receptacle in a keyboard included in the stand.

15. The method of claim 12, further including:
    receiving a first indication that the display is in the first open position; and
    receiving a second indication that the display is in the second open position.

* * * * *